(12) United States Patent
Guron et al.

(10) Patent No.: US 10,719,534 B2
(45) Date of Patent: Jul. 21, 2020

(54) ROLLUP ENGINE FOR INTERNET OF THINGS

(71) Applicant: General Electric Company, Schenectady, NY (US)

(72) Inventors: Rupinder S Guron, San Ramon, CA (US); Aditya Swamy, San Ramon, CA (US)

(73) Assignee: General Electric Company, Schenectady, NY (US)

(*) Notice: Subject to any disclaimer, the term of this patent is extended or adjusted under 35 U.S.C. 154(b) by 499 days.

(21) Appl. No.: 15/422,927

(22) Filed: Feb. 2, 2017

(65) Prior Publication Data

US 2018/0218060 A1 Aug. 2, 2018

(51) Int. Cl.
*G06F 16/28* (2019.01)
(52) U.S. Cl.
CPC ................. *G06F 16/283* (2019.01)
(58) Field of Classification Search
CPC .................................. G06F 16/283
See application file for complete search history.

(56) References Cited

U.S. PATENT DOCUMENTS

| | | | |
|---|---|---|---|
| 6,775,682 B1 | 8/2004 | Bellamkonda et al. | |
| 8,538,954 B2 | 9/2013 | George et al. | |
| 8,665,118 B1 * | 3/2014 | Woodard | G08G 1/144 340/932.2 |
| 9,047,349 B2 | 6/2015 | Shaked et al. | |
| 2008/0016057 A1 | 1/2008 | Bakalash et al. | |
| 2013/0262035 A1 | 10/2013 | Mills | |
| 2013/0290242 A1 | 10/2013 | Suzuki | |
| 2014/0266802 A1 * | 9/2014 | Love | G08G 1/144 340/932.2 |
| 2014/0279824 A1 | 9/2014 | Tamayo | |
| 2015/0379080 A1 | 12/2015 | Jochimski | |
| 2016/0019294 A1 * | 1/2016 | Dong | H04W 4/70 707/94 |

FOREIGN PATENT DOCUMENTS

WO 2016057211 A1 4/2016

OTHER PUBLICATIONS

Predix Architecture and Services, pp. 1-30, Sep. 2015.*
Parimala et al., "On New Roll-up Possibilities for Data Stream Warehouse", Proceeding ACST'07 Proceedings of the third conference on IASTED International Conference: Advances in Computer Science and Technology, pp. 523-528, http://dl.acm.org/citation.cfm?id=1322556, 2007, 7 pp.

* cited by examiner

*Primary Examiner* — Albert M Phillips, III
(74) *Attorney, Agent, or Firm* — Buckley, Maschoff & Talwalkar LLC

(57) ABSTRACT

The example embodiments are directed to a data rollup engine for use in software applications hosted by a cloud platform such as in an Internet of Things. As one example, the method includes receiving sensor data associated with at least one Internet of Things (IoT) asset, processing a data rollup engine on the sensor data to generate rolled-up sensor data having a granularity determined by a user, and executing one or more operations on the rolled-up sensor data to generate information associated with the at least one IoT asset. The rollup engine is not limited to a particular type of asset and enables substantial amounts of raw time series data to be rolled up and grouped based on properties thereof.

21 Claims, 6 Drawing Sheets

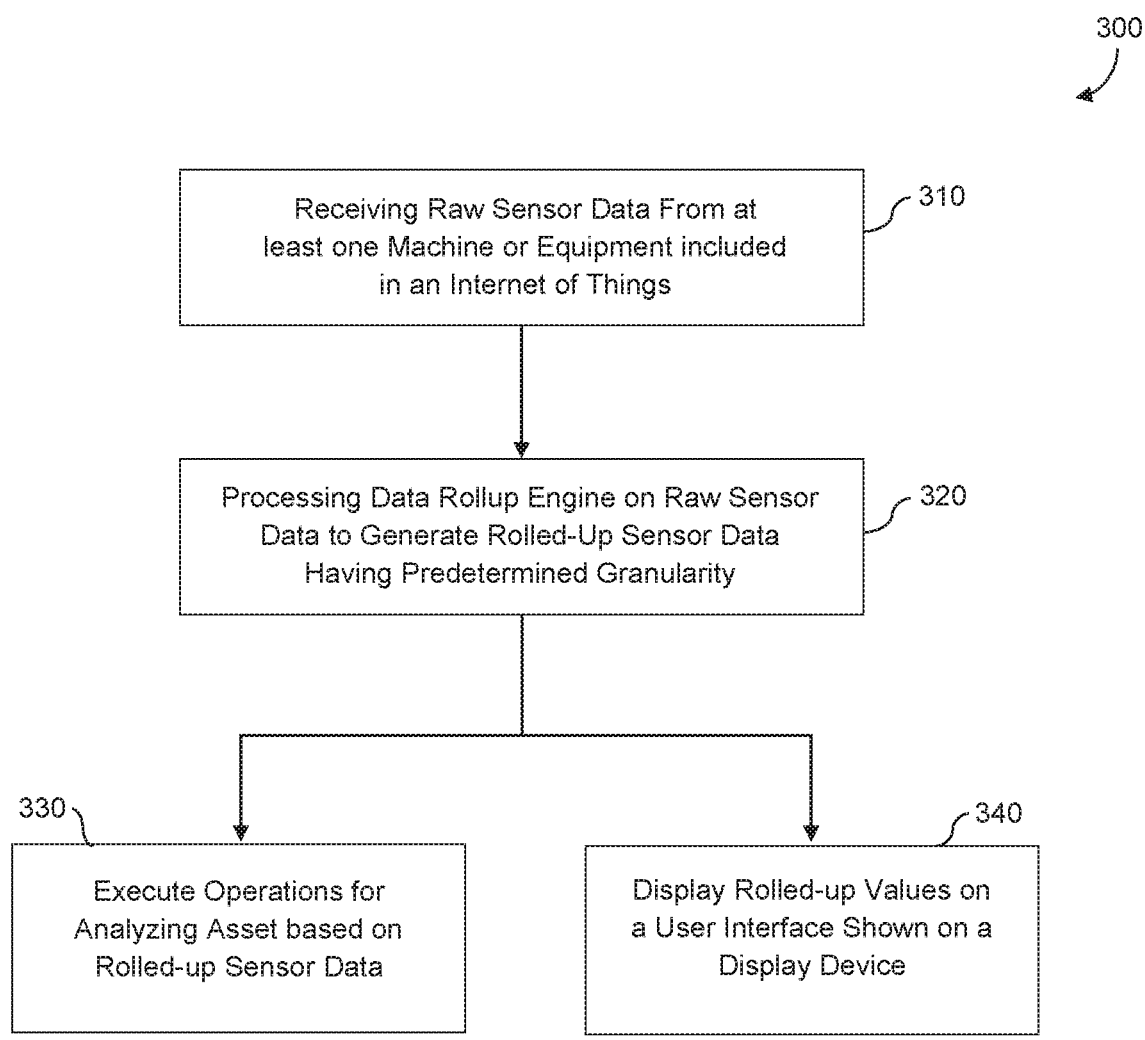

FIG. 5
500
| Mach. ID | Site ID | Pieces Fed | Pieces Completed | Pieces Out. | Runtime | Fault Time | Date Time |
|---|---|---|---|---|---|---|---|
| 3 | 1 | 85 | 72 | 24 | 77 | 95 | 11/29/2016 01:14:00 |
| 1 | 1 | 15 | 8 | 96 | 48 | 18 | 11/29/2016 05:14:00 |
| 1 | 1 | 53 | 22 | 35 | 73 | 35 | 11/29/2016 04:14:00 |
| 2 | 1 | 52 | 47 | 98 | 3 | 46 | 11/29/2016 06:14:00 |
| 2 | 1 | 78 | 92 | 40 | 97 | 40 | 11/29/2016 13:14:00 |
| 2 | 1 | 58 | 8 | 80 | 63 | 78 | 11/29/2016 15:10:00 |
Raw Machine Data
510
| Mach. ID | Site ID | Total Pieces Out. | Total Runtime | Total Fault Time | Date | Site Efficiency | Machine Efficiency |
|---|---|---|---|---|---|---|---|
| 3 | 1 | 24 | 77 | 95 | 11/29/16 | 1.72 | 14.0% |
| 2 | 1 | 218 | 163 | 164 | 11/29/16 | 3.27 | 66.7% |
| 1 | 1 | 131 | 121 | 53 | 11/29/16 | 1.73 | 75.7% |
Rolled-up Data

ROLLUP ENGINE FOR INTERNET OF THINGS

BACKGROUND

Machine and equipment assets, generally, are engineered to perform particular tasks as part of a business process. For example, assets can include, among other things and without limitation, industrial manufacturing equipment on a production line, drilling equipment for use in mining operations, wind turbines that generate electricity on a wind farm, transportation vehicles, and the like. As another example, assets may include healthcare machines and equipment that aid in diagnosing patients such as imaging devices (e.g., X-ray or MM systems), monitoring devices, and the like. The design and implementation of these assets often takes into account both the physics of the task at hand, as well as the environment in which such assets are configured to operate.

Low-level software and hardware-based controllers have long been used to drive machine and equipment assets. However, the rise of inexpensive cloud computing, increase in sensor capabilities, decrease in sensor costs, and the proliferation of mobile technologies have generated new opportunities for creating novel industrial and healthcare based assets with improved sensing technology and which are capable of transmitting data that can then be distributed throughout a network. As a consequence, there are new opportunities to enhance the business value of some assets through the use of novel industrial-focused hardware and software.

When sensor data is first acquired, the sensed data is in raw format. In particular, raw sensor data that is captured from or in association with machine and equipment assets is not user friendly and often includes data that is not relevant or of interest. For example, the raw data is not useful for monitoring the asset or performing analytics associated with the asset because these functions require the data to be converted into more usable format capable of being read and understood by other software and hardware. Furthermore, the sensed data may come from multiple sources that each measure different characteristics and features associated with the asset. Accordingly, what is needed is a solution that can modify raw sensor data into a more usable format and which is capable of being used across different machines, systems, and equipment.

SUMMARY

In an aspect of an example embodiment, provided is a method including receiving sensor data associated with at least one Internet of Things (IoT) asset, processing a data rollup engine on the sensor data to generate rolled-up sensor data having a granularity determined by a user, and executing one or more operations on the rolled-up sensor data to generate information associated with the at least one IoT asset.

In an aspect of another example embodiment, provided is a computing system including a network interface configured to receive sensor data associated with at least one Internet of Things (IoT) asset, and a processor configured to process a data rollup engine on the sensor data to generate rolled-up sensor data having a granularity determined by a user, and execute one or more operations on the rolled-up sensor data to generate information associated with the at least one IoT asset.

In an aspect of another example embodiment, there is provided a non-transitory computer readable medium having stored therein instructions that when executed cause a computer to perform a method including receiving sensor data associated with at least one Internet of Things (IoT) asset, processing a data rollup engine on the sensor data to generate rolled-up sensor data having a granularity determined by a user, and executing one or more operations on the rolled-up sensor data to generate information associated with the at least one IoT asset.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 3 is a diagram illustrating a method for rolling up data in accordance with an example embodiment.

FIG. 5 is a diagram illustrating an example of raw data and rolled-up data in accordance with an example embodiment.

Figure 1:
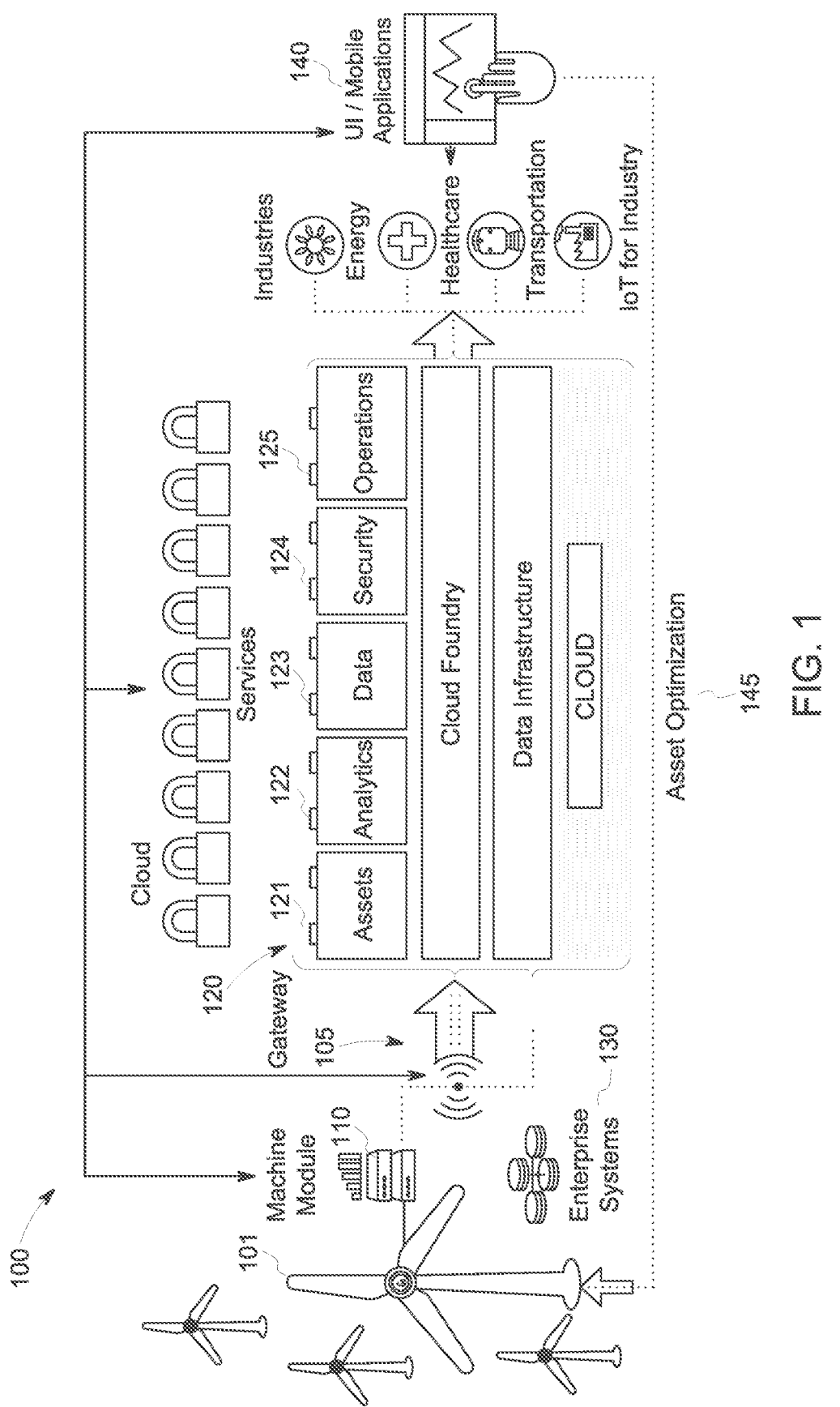
FIG. 1 is a diagram illustrating a cloud computing environment associated with industrial systems in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown.

The example embodiments are directed to a data rollup engine that is capable of aggregating substantial amounts of raw data based on one or more properties of the data. The data rollup engine may be implemented by applications that are part of an Internet of Things (IoT) environment. For example, applications deployed on a cloud platform of the IoT may use the data rollup engine to convert raw sensor data (e.g., from machines and equipment on the edge of the IoT) into a more suitable format for further processing, display, analyzation, and the like, by the application and by other software. The rollup engine may be incorporated into a software library such as a Java library, stored on the cloud platform, and be accessible to other software (e.g., analytics, services, data storage, etc.) that is deployed on the cloud platform. A developer of a software application may further customize the rollup engine to perform particular aggregation on particular fields of data related thereto, however, the rollup engine may include a common core of elements for use with any type of time-series data associated with any type of machine and/or equipment.

One of the most common types of data sensed within an IoT environment is time-series data. Sensors and devices (e.g., machines, equipment, computing devices, and the like) used in an IoT architecture emit a significant amount of time-series data. Time stamped sensor data is critical for monitoring and improving operational characteristics of an intelligent business such as a manufacturing plant, oil rig, assembly line, production plant, chemical plant, railroad, fleet of aircraft, and the like. However, in raw form, time-series sensor data is not of much use from a monitoring/diagnostics perspective. Therefore, aggregating (i.e., rolling-up) the data from across multiple dimensions and using multiple pivots can provide valuable insights into the data. The data rollup engine also provides a number of advantages including the ability to take advantage of multi core architectures, inexpensive and easy horizontal scaling, and platform neutral (e.g., implemented in Java) which is ideal for cloud-based and cloud-deployed applications. In some embodiments, the rollup engine may be implemented as a software library that is an embeddable component of a Java ecosystem and may be used as a dependency for other software.

While progress with machine and equipment automation has been made over the last several decades, and assets have become 'smarter,' the intelligence of any individual asset pales in comparison to intelligence that can be gained when multiple smart devices are connected together, for example, in the cloud. As described herein, an asset is used to refer to equipment and/or a machine used in fields such as energy, healthcare, transportation, heavy manufacturing, chemical production, printing and publishing, electronics, textiles, and the like. Aggregating data collected from or about multiple assets can enable users to improve business processes, for example by improving effectiveness of asset maintenance or improving operational performance if appropriate industrial-specific data collection and modeling technology is developed and applied. The data rollup engine described herein is capable of aggregating data based on For example, an asset can be outfitted with one or more sensors configured to monitor respective operations or conditions thereof. Data from the sensors can be added to the cloud platform. By bringing such data into a cloud-based environment, new software applications informed by industrial process, tools and know-how can be constructed, and new physics-based analytics specific to an industrial environment can be created. Insights gained through analysis of such data can lead to enhanced asset designs, enhanced software algorithms for operating the same or similar assets, better operating efficiency, and the like. Examples of the software applications are described herein as analytics. Analytics may be used to analyze, evaluate, and further understand issues related to manufacturing. Prior to the data becoming suitable for processing by various applications, the example embodiments may implement the data rollup engine on the data to thereby convert raw data into a format this is capable of being understood or recognized by the applications.

The assets can include or can be a portion of an Industrial Internet of Things (IIoT). In an example, an IIoT connects assets including machines and equipment, such as turbines, jet engines, healthcare machines, locomotives, oil rigs, and the like, to the Internet and/or a cloud, or to each other in some meaningful way such as through one or more networks. The examples described herein can include using a "cloud" or remote or distributed computing resource or service. The cloud can be used to receive, relay, transmit, store, analyze, or otherwise process information for or about one or more assets. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

However, the integration of assets with the remote computing resources to enable the IIoT often presents technical challenges separate and distinct from the specific industry and from computer networks, generally. A given machine or equipment based asset may need to be configured with novel interfaces and communication protocols to send and receive data to and from distributed computing resources. Assets may have strict requirements for cost, weight, security, performance, signal interference, and the like, in which case enabling such an interface is rarely as simple as combining the asset with a general purpose computing device. To address these problems and other problems resulting from the intersection of certain industrial fields and the IIoT, embodiments provide a cloud platform that can receive and deploy applications from many different fields of industrial technologies. In order for these applications to successfully consume data from machines and equipment also connected to the cloud, the embodiments provide a data rollup engine that converts the raw data acquired from the edge of the cloud or other sources into a more usable format.

The Predix™ platform available from GE is a novel embodiment of an Asset Management Platform (AMP) technology enabled by state of the art cutting edge tools and cloud computing techniques that enable incorporation of a manufacturer's asset knowledge with a set of development tools and best practices that enables asset users to bridge gaps between software and operations to enhance capabilities, foster innovation, and ultimately provide economic value. Through the use of such a system, a manufacturer of assets can be uniquely situated to leverage its understanding of assets themselves, models of such assets, and industrial operations or applications of such assets, to create new value for industrial customers through asset insights.

FIG. 1 illustrates a cloud computing environment associated with industrial systems in accordance with an example embodiment. FIG. 1 illustrates generally an example of portions of an asset management platform (AMP) 100. As further described herein, one or more portions of an AMP can reside in a cloud computing system 120, in a local or sandboxed environment, or can be distributed across multiple locations or devices. The AMP 100 can be configured to perform any one or more of data acquisition, data analysis, or data exchange with local or remote assets, or with other task-specific processing devices. The AMP 100 includes an asset community (e.g., turbines, healthcare machines, industrial, manufacturing systems, oil rigs, etc.) that is communicatively coupled with the cloud computing system 120. In an example, a machine module 110 receives information from, or senses information about, at least one asset member of the asset community, and configures the received information for exchange with the cloud computing system 120. In an example, the machine module 110 is coupled to the cloud computing system 120 or to an enterprise computing system 130 via a communication gateway 105.

In an example, the communication gateway 105 may include or may use a wired or wireless communication channel that extends at least from the machine module 110 to the cloud computing system 120. The cloud computing system 120 may include several layers, for example, a data infrastructure layer, a cloud foundry layer, and modules for providing various functions. In FIG. 1, the cloud computing system 120 includes an asset module 121, an analytics module 122, a data acquisition module 123, a data security module 124, and an operations module 125, but the embodiments are not limited thereto. Each of the modules includes or uses a dedicated circuit, or instructions for operating a general purpose processor circuit, to perform the respective functions. In an example, the modules 121-125 are communicatively coupled in the cloud computing system 120 such that information from one module can be shared with another. In an example, the modules 121-125 are co-located at a designated datacenter or other facility, or the modules 121-125 can be distributed across multiple different locations.

An interface device 140 (e.g., user device, workstation, tablet, laptop, appliance, kiosk, and the like) can be configured for data communication with one or more of the machine module 110, the gateway 105, and the cloud computing system 120. The interface device 140 can be used to monitor or control one or more assets. As another example, the interface device 140 may be used to develop and upload applications to the cloud computing system 120. As yet another example, the interface device 140 may be used to access analytical applications deployed on the cloud computing system 120. In an example, information about the asset community may be presented to an operator at the interface device 140. The information about the asset community may include information from the machine module 110, information from the cloud computing system 120, and the like. The interface device 140 can include options for optimizing one or more members of the asset community based on analytics performed at the cloud computing system 120. Prior to analytics being accessed through the cloud computing system 120, the cloud computing system 120 may perform an onboarding process on the analytics before they are added to the platform, according to various embodiments.

A user of the interface device 140 may control an asset through the cloud computing system 120, for example, by selecting a parameter update for a wind turbine 101. In this example, the parameter update may be pushed to the wind turbine 101 via one or more of the cloud computing system 120, the gateway 105, and the machine module 110. In some examples, the interface device 140 is in data communication with the enterprise computing system 130 and the interface device 140 provides an operation with enterprise-wide data about the asset community in the context of other business or process data. For example, choices with respect to asset optimization can be presented to an operator in the context of available or forecasted raw material supplies or fuel costs.

As another example, choices with respect to asset optimization can be presented to an operator in the context of a process flow to identify how efficiency gains or losses at one asset can impact other assets.

Returning again to the example of FIG. 1, some capabilities of the AMP 100 are illustrated. The example of FIG. 1 includes the asset community with multiple wind turbine assets, including the wind turbine 101. However, it should be understood that wind turbines are merely used in this example as a non-limiting example of a type of asset that can be a part of, or in data communication with, the first AMP 100. Examples of other assets include healthcare machines and equipment, aircraft, locomotives, oil rigs, manufacturing machines and equipment, textile processing machines, chemical processing machines, and the like.

FIG. 1 further includes the device gateway 105 configured to couple the asset community to the cloud computing system 120. The device gateway 105 can further couple the cloud computing system 120 to one or more other assets or asset communities, to the enterprise computing system 130, or to one or more other devices. The AMP 100 thus represents a scalable industrial solution that extends from a physical or virtual asset (e.g., the wind turbine 101) to a remote cloud computing system 120. The cloud computing system 120 optionally includes a local, system, enterprise, or global computing infrastructure that can be optimized for industrial data workloads, secure data communication, and compliance with regulatory requirements.

The cloud computing system 120 can include the operations module 125. The operations module 125 can include services that developers can use to build or test Industrial Internet applications, and the operations module 125 can include services to implement Industrial Internet applications, such as in coordination with one or more other AMP modules. In an example, the operations module 125 includes a microservices marketplace where developers can publish their services and/or retrieve services from third parties. In addition, the operations module 125 can include a development framework for communicating with various available services or modules. The development framework can offer developers a consistent look and feel and a contextual user experience in web or mobile applications. Developers can add and make accessible their applications (services, data, analytics, etc.) via the cloud computing system 120.

Information from an asset, about the asset, or sensed by an asset itself may be communicated from the asset to the data acquisition module 123 in the cloud computing system 120. In an example, an external sensor can be used to sense information about a function of an asset, or to sense information about an environment condition at or near an asset. The external sensor can be configured for data communication with the device gateway 105 and the data acquisition module 123, and the cloud computing system 120 can be configured to use the sensor information in its analysis of one or more assets, such as using the analytics module 122. Using a result from the analytics module 122, an operational model can optionally be updated, such as for subsequent use in optimizing the first wind turbine 101 or one or more other assets, such as one or more assets in the same or different asset community. For example, information about the wind turbine 101 can be analyzed at the cloud computing system 120 to inform selection of an operating parameter for a remotely located second wind turbine that belongs to a different asset community.

The cloud computing system 120 may include a Software-Defined Infrastructure (SDI) that serves as an abstraction layer above any specified hardware, such as to enable a data center to evolve over time with minimal disruption to overlying applications. The SDI enables a shared infrastructure with policy-based provisioning to facilitate dynamic automation, and enables SLA mappings to underlying infrastructure. This configuration can be useful when an application requires an underlying hardware configuration. The provisioning management and pooling of resources can be done at a granular level, thus allowing optimal resource allocation. In addition, the asset cloud computing system 120 may be based on Cloud Foundry (CF), an open source PaaS that supports multiple developer frameworks and an ecosystem of application services. Cloud Foundry can make it faster and easier for application developers to build, test, deploy, and scale applications. Developers thus gain access to the vibrant CF ecosystem and an ever-growing library of CF services. Additionally, because it is open source, CF can be customized for IIoT workloads.

The cloud computing system 120 can include a data services module that can facilitate application development. For example, the data services module can enable developers to bring data into the cloud computing system 120 and to make such data available for various applications, such as applications that execute at the cloud, at a machine module, or at an asset or other location. In an example, the data services module can be configured to cleanse, merge, or map data before ultimately storing it in an appropriate data store, for example, at the cloud computing system 120. A special emphasis may be placed on time series data, as it is the data format that most sensors use.

Security can be a concern for data services that exchange data between the cloud computing system 120 and one or more assets or other components. Some options for securing data transmissions include using Virtual Private Networks (VPN) or an SSL/TLS model. In an example, the AMP 100 can support two-way TLS, such as between a machine module and the security module 124. In an example, two-way TLS may not be supported, and the security module 124 can treat client devices as OAuth users. For example, the security module 124 can allow enrollment of an asset (or other device) as an OAuth client and transparently use OAuth access tokens to send data to protected endpoints.

The data rollup engine according to various embodiments may be implemented within a software library and may be incorporated within software applications that are stored on the cloud computing system 120. Raw data may be provided to the cloud computing system 120 via the assets included in the asset community and accessed by applications deployed on the cloud computing system 120. During operation, an application may execute the rollup engine on the raw data to generate rolled-up data that is more suitable for data analytics and display.

Figure 2A:
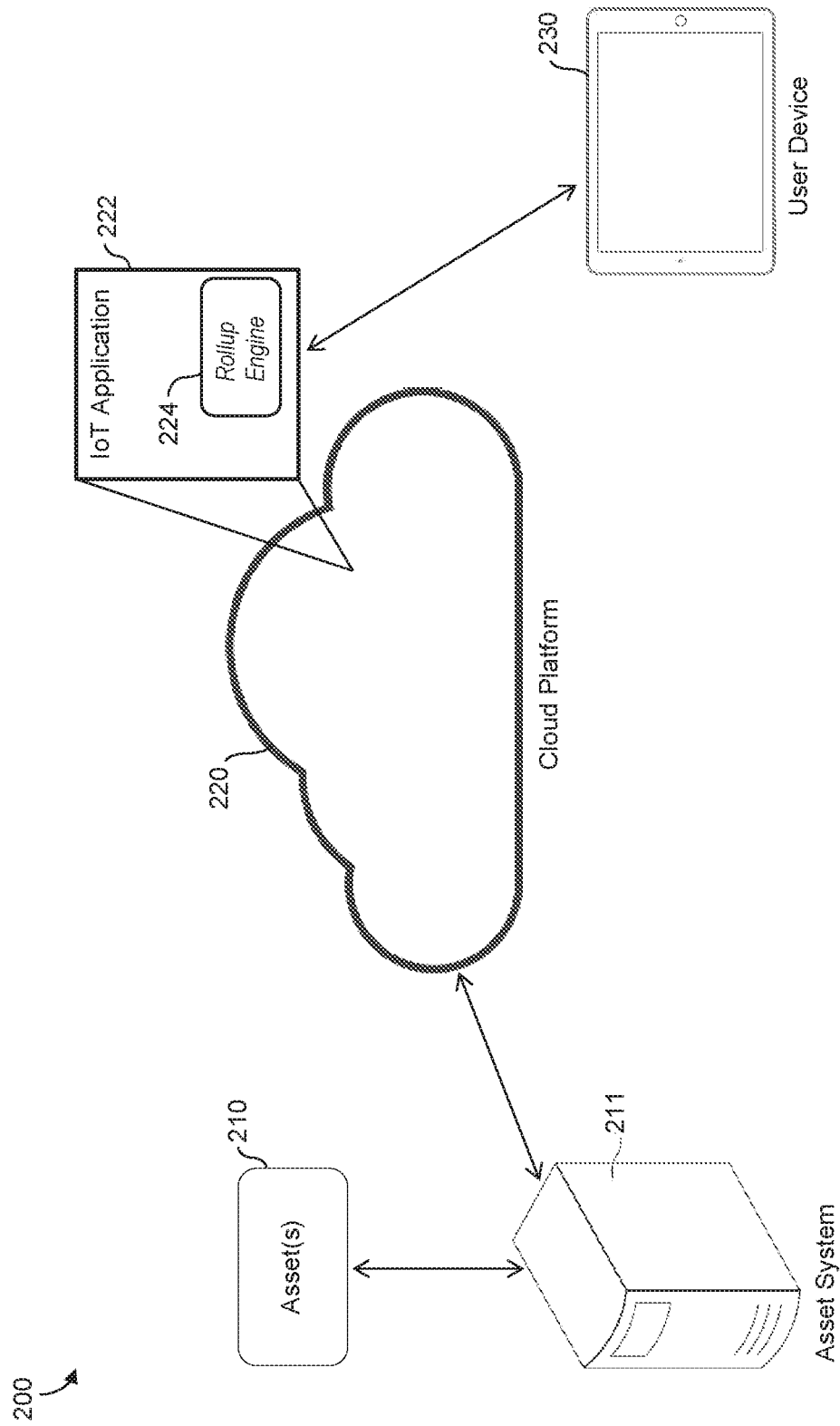
FIG. 2A is a diagram illustrating s system for processing a data rollup engine in accordance with an example embodiment.

FIG. 2A illustrates a system 200 for processing a data rollup engine in accordance with an example embodiment. The system 200 includes an asset 210 associated with a computing system 211, a cloud platform 220, and a user device 230. In this example, an IoT based application 222 is deployed on the cloud platform 220 and has a rollup engine 224 implemented therein. The asset 210 may include one or more assets that emit time-series data. For example, the type of the asset is not limited and may include industrial-based assets, manufacturing-based assets, transportation-based assets, energy-based assets, and the like. The raw sensor or machine data may be emitted from the asset 210 or sensed by the computing system 211 and provided to the cloud platform 220 in a stream, a feed, a file such as an Extensible Markup Language (XML) file, and the like. The data provided from the asset 210 may be converted into a rolled-up format that is more suitable for further processing, display, and analysis for the application 222 by the data rollup engine 224.

According to various aspects, the rollup engine 224 may be stored on the cloud platform 220 and be accessed by developers of applications, services, and other software deployed thereon such as a developer of application 222. Here, the rollup engine 224 may be a software library such as a Java library, or the like, which is included within a framework of the application 222. For example, the rollup engine 224 may be set as a dependency of the application 222. The rollup engine 224 may be compatible with any application that operates on time-series data regardless of the type of asset. Accordingly, a type of the asset 210 or the application 222 associated therewith is not limited to any particular industry or field. The rollup engine 224 may have an interface (such as Java) that allows the engine to receive and transmit data to and from the application 222. In operation, the rollup engine 224 may be processed on the raw sensor data to convert the raw sensor data into rolled-up data. Furthermore, rolled-up data may be output to a display device such as a screen of user device 230. As another example, the rolled-up data may have one or more different operations (e.g., analytics or further aggregation) performed thereon to generate additional information associated with the asset 210, and the like. For example, the analytics may be performed on the rolled-up data to further monitor and predict the behavior associated with the asset 210.

An example of raw sensor data 500 is shown in FIG. 5. In this example, the sensor data 500 is acquired from a plurality of printing machines that perform a printing process to generate pieces of printed material. Each machine (1-3) has various fields of information that is read/sensed and provided to the cloud platform such as pieces fed, pieces completed, pieces outsources, runtime, fault time, and a date/time stamp during which the reading took place. The data rollup engine may be executed on the sensor data 500 to generate rolled-up data 510 shown at the bottom of FIG. 5. Each field may have one or more different respective rules for rolling-up data associated therewith and different respective granularities. For example, the machine ID, and site ID fields may be combined while the total pieces out, total runtime, and total fault time may be a summation of all pieces out, runtime, and fault time added together, for each respective machine over a predetermined pivot of time (i.e., granularity). In addition, one or more analytics associated with the fields such as machine efficiency and site efficiency may be performed by the rollup engine to provide additional information about the raw sensor data.

Referring again to FIG. 2A, the rollup engine 224 may include an instruction set which can be modified based on specific characteristics of an application that desires to implement the rollup engine. The instruction set may contain instructions for rolling up data that are to be performed by the rollup engine 224. The instruction set may contain initial default instructions which are capable of being modified by the developer. Also, the rollup engine 224 may include step-by-step information to enable a user/developer to modify the instruction set. As an example, the instruction set of the rollup engine 224 may include/identify a raw sensor data input (i.e., rollable data), an aggregation granularity (e.g., hour, day, week, month, quarter, etc.), a listing of fields included in the rollable data, rules for aggregating fields of the rollable data, at least one filter to remove unnecessary data, aggregates for further consolidating analytics around the fields of the rollable data, at least one filter for the aggregates for removing unnecessary data, a data structure for outputting rolled-up data, and the like. These fields may be set at default or they may be customized by a user (e.g., developer) of an application to optimize the rollup engine based on specific use cases of the application. Also, the user may determine the granularity associated with the rolled-up data. For example, a granularity for each field of data may be defined by the instruction set associated with the rollup engine 224.

Based on the instruction set, the rollup engine 224 may be executed to process raw sensor data, machine data, etc., and convert the raw data into usable aggregated data capable of being further analyzed, displayed, and/or processed. For example, the raw data may be converted into a format more usable and may be output in another file, displayed on a user interface, and/or the like. Accordingly, the rollup engine 224 may refer to a processing engine that enables substantial amounts of data to be rolled up/grouped by various data properties on various time series (e.g., daily, weekly, monthly, quarterly, etc.). In the process, the rollup engine 224 has the capability to apply numerous aggregation functions (e.g., percentages, efficiencies, sums, averages, etc.) on the rolled up data. Furthermore, the rollup engine 224 includes an instruction set that may be customized to optimize performance of the rollup engine 224.

Figure 2B:
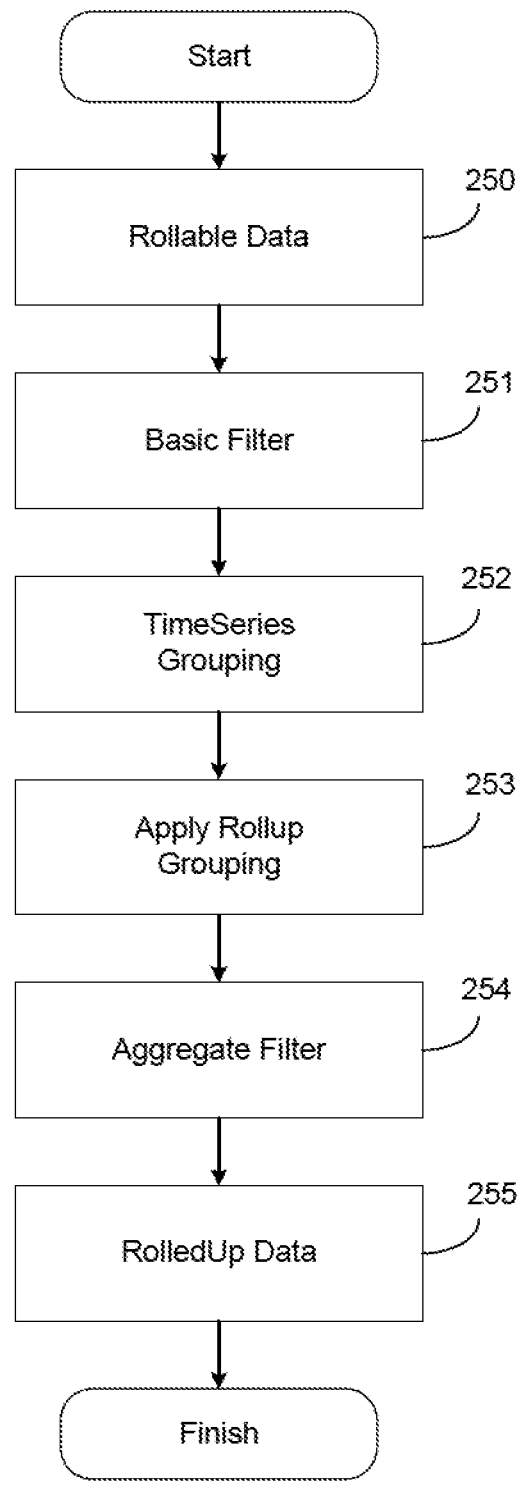
FIG. 2B is a diagram illustrating a process of a rollup engine in accordance with an example embodiment.

FIG. 2B illustrates an example of the process of the rollup engine 224 in operation for aggregating data of the application 222. In this example, the rollup engine processes the rollable data based on the instruction set. In the example of FIG. 2B, the rollable data is acquired in 250. In 251, at least one filter is applied to the rollable data to remove data that is unimportant or unnecessary to the rollup engine 224. In 252, grouping rules for aggregating/combining the raw time series data is identified and the grouping rules are applied to the rollable data in 253. In 254, another filter is applied to remove data that is unimportant or unnecessary to the rollup engine after the grouping, and the rolled-up data is finalized in 255. It should be appreciated that FIG. 2B is merely an example, and the rollup engine 224 may perform the steps in a different order, include different steps not shown in this example, and/or omit steps shown.

FIG. 3 illustrates a method 300 for rolling up data in accordance with an example embodiment. For example, the method 300 may be performed by an application executing or deployed on a computing device such as a server, a web server, a cloud computing platform, a database, and the like. Referring to FIG. 3, in 310, the method includes receiving sensor data associated with at least one Internet of Things (IoT) asset. For example, the received sensor data may include time-series data sensed from the at least one IoT asset where the at least one IoT asset includes at least one of a machine and an equipment connected to a cloud platform. The sensor data may include a stream of data or a file of data such as an Extensible Markup Language (XML) file, and the like.

In 320, the method further includes processing a data rollup engine on the sensor data to generate rolled-up sensor data having a granularity determined by a user. For example, the data rollup engine may be implemented as a software library configured for use by software executing on a cloud platform. An example of the software library is a Java class library, and the like. The library may be imported or otherwise added as a dependency to software deployed on the cloud platform. According to various embodiments, the data rollup engine may include an instruction set that includes one or more of an identification of a field of data included in the sensor data, rules for aggregating data included in the field (e.g., predetermined granularity, rules for combining data, etc.), a data structure format for outputting the aggregated data of the field, a filter that removes non-rollable data from the sensor data before the sensor data is rolled-up, and the like. The instruction set may be a default instruction set and/or it may be modified by a user. For example, the user may determine a granularity desired as well as a period of overall time for performing the rollup.

Next, the rolled-up data may have one or more operations executed thereon to generate information associated with the at least one IoT asset, in 330, or the rolled-up sensor data may have one or more values thereof output to a display in 340. Here, the display may include a display screen showing a user interface. In the case of executing one or more operations in 330, analytical operations may be executed on the rolled-up sensor data to generate analytics associated with the at least one IoT asset.

Figure 4:
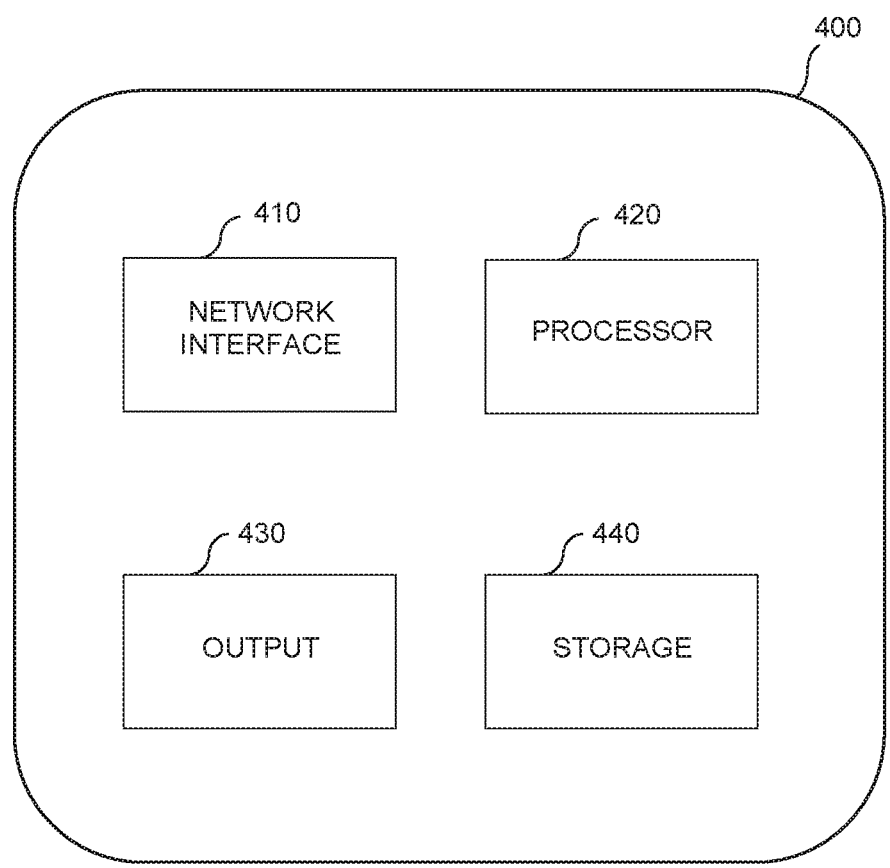
FIG. 4 is a diagram illustrating a computing device for rolling up data in accordance with example embodiments.

FIG. 4 illustrates a computing device 400 for rolling up data in accordance with example embodiments. In some examples, the computing device 400 may be server, a database, a cloud computing device or instance, a device attached to a cloud platform, a user device or workstation, and the like. In some examples, the computing device 400 may perform the method 300 of FIG. 3. Referring to FIG. 4, the device 400 includes a network interface 410, a processor 420, an output 430, and a storage device 440. Although not shown in FIG. 4, the device 400 may include other components such as a display, an input unit, a receiver/transmitter, and the like. The network interface 410 may transmit and receive data over a network such as the Internet, a private network, a public network, and the like. The network interface 410 may be a wireless interface, a wired interface, or a combination thereof. The processor 420 may include one or more processing devices each including one or more processing cores. In some examples, the processor 420 is a multicore processor or a plurality of multicore processors. Also, the processor 420 may be fixed or it may be reconfigurable. The output 430 may output data to an embedded display of the device 400, an externally connected display, a cloud-based device or application, and the like. The storage device 440 is not limited to any particular storage device and may include any known memory device such as RAM, ROM, hard disk, and the like.

According to various aspects, the network interface 410 may receive sensor data associated with at least one Internet of Things (IoT) asset. For example, the received sensor data may include a stream of data, a file such as XML file, and the like. Here, the received sensor data may include time-series data sensed from the at least one IoT asset which includes at least one of a machine or an equipment connected to a cloud platform via an IoT. For example, the asset may include a vehicle, aircraft, locomotive, oil rig, healthcare machine, industrial manufacturing machine/equipment, textile machines/equipment, and the like. The processor 420 may process or execute a data rollup engine on the sensor data to generate rolled-up sensor data having a predetermined granularity. For example, the data rollup engine may be software such as a library that is included within a software application stored in the storage 440. According to various embodiments, the data rollup engine may be designed for a platform such as a cloud storage environment. In addition, the processor 420 may execute one or more operations (e.g., analytics, further aggregations, etc.) on the rolled-up sensor data to generate information associated with the at least one IoT asset.

According to various embodiments, the data rollup engine executed by the processor 420 may be executed based on an instruction set of the data rollup engine which includes an identification of a field of data included in the sensor data, rules for aggregating data included in the field, and a data structure format for outputting the aggregated data of the field. In some examples, the instruction set includes one or more filter that removes non-rollable data from the sensor data and removes unnecessary data from aggregated data before the aggregated data is output. The instruction set may be provided by a user or developer of the application which incorporates the rollup engine and may include a predetermined granularity input by a user of the application. The predetermined granularity may include a period of time over which to aggregate a field of data included within the raw sensor data.

Various embodiments are directed to a data rollup engine for use by software and data which are deployed in a cloud platform environment such as in an Internet of Things. The rollup engine may process substantial amounts of raw time-series data and perform a data rollup of the time-series data based on various properties thereof. The rollup engine may also apply aggregation functions such as percentages, efficiencies, sums, averages, and the like, on the rolled up data thereby enhancing the raw sensor data into a more understandable and comprehendible format for users and software programs. The rollup engine may also include an instruction set that controls processing of the rollup engine and that may be customized to optimize performance thereof.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A method comprising:
receiving raw sensor data measured from an operation of at least one Internet of Things (IoT) asset, the raw sensor data comprising a plurality of fields;
identifying, via a processor, rolling-up rules for each of the plurality of fields and an aggregation granularity from an instruction set of a data rollup engine, wherein at least two fields among the plurality of fields have different rolling-up rules including a first rule for matching a non-measured identifier stored in a first field from across a plurality of raw sensor data points captured during a period of time identified by the aggregation granularity, and a second rule for aggregating a measured numerical value stored in a second field from across the plurality of raw sensor data points which are matched by the first rule to create a total measured numerical value for the non-measured identifier during the period of time;
processing, via the processor, the data rollup engine on the raw sensor data based on the different rolling-up rules identified from the instruction set to generate rolled-up sensor data comprising the total measured value for the non-measured identifier during the period of time; and
executing, via the processor, one or more operations on the rolled-up sensor data to generate information associated with the at least one IoT asset.

2. The method of claim 1, wherein the data rollup engine comprises a software library embedded within a software application.

3. The method of claim 1, wherein the identifying further comprises identifying an identification of a field of data included in the raw sensor data, the rolling-up rules for aggregating data included in the field, and a data structure format for outputting the aggregated data of the field, from the instruction set.

4. The method of claim 3, wherein the instruction set further comprises a filter that removes non-rollable data from the raw sensor data before the sensor data is rolled-up.

5. The method of claim 1, wherein the raw sensor data comprises Extensible Markup Language (XML) data, and the data rollup engine is processed on the XML data.

6. The method of claim 1, wherein the raw sensor data comprises time series data sensed from the at least one IoT asset, and
the at least one IoT asset comprises at least one of a machine and an equipment connected to a cloud platform via an IoT.

7. The method of claim 6, wherein the executing comprises executing one or more predictive operations on the rolled-up sensor data to generate analytics associated with the at least one IoT asset.

8. The method of claim 1, wherein the aggregation granularity comprises a period of time to use for aggregating fields of the raw sensor data and is input by a user of the executing application.

9. A computing system comprising:
a network interface configured to receive raw sensor data measured from an operation of at least one Internet of Things (IoT) asset, the raw sensor data comprising a plurality of fields; and
a processor configured to
identify rolling-up rules for each of the plurality of fields and an aggregation granularity from an instruction set of a data rollup engine, wherein at least two fields among the plurality of fields have different rolling-up rules including a first rule for matching a non-measured identifier stored in a first field from across a plurality of raw sensor data points captured during a period of time identified by the aggregation granularity, and a second rule for aggregating a measured numerical value stored in a second field from across the plurality of raw sensor data points which are matched by the first rule to create a total measured numerical value for the non-measured identifier during the period of time,
process the data rollup engine on the raw sensor data based on the different rolling-up rules identified from the instruction set to generate rolled-up sensor data comprising the total measured value for the non-measured identifier during the period of time, and
execute one or more operations on the rolled-up sensor data to generate information associated with the at least one IoT asset.

10. The computing system of claim 9, wherein the data rollup engine comprises a software library embedded within a software application.

11. The computing system of claim 9, wherein the processor is further configured to identify an identification of a field of data included in the raw sensor data, the rolling-up rules for aggregating data included in the field, and a data structure format for outputting the aggregated data of the field, from the instruction set.

12. The computing system claim 11, wherein the instruction set further comprises a filter that removes non-rollable data from the raw sensor data before the sensor data is rolled-up.

13. The computing system of claim 9, wherein the raw sensor data comprises Extensible Markup Language (XML) data, and the data rollup engine is processed on the XML data.

14. The computing system of claim 9, wherein the raw sensor data comprises time series data sensed from the at least one IoT asset, and
the at least one IoT asset comprises at least one of a machine and an equipment connected to a cloud platform via an IoT.

15. The computing system of claim 14, wherein the processor is configured to execute one or more predictive operations on the rolled-up sensor data to generate analytics associated with the at least one IoT asset.

16. The computing system of claim 9, wherein the aggregation granularity comprises a period of time to use for aggregating fields of the raw sensor data and is input by a user of the executing application.

17. A method comprising:
receiving raw sensor data measured from an operation of at least one Internet of Things (IoT) asset, the raw sensor data comprising a plurality of fields;
identifying, via a processor, rolling-up rules for each of the plurality of fields and an aggregation granularity from an instruction set of a data rollup engine, wherein at least two fields among the plurality of fields have different rolling-up rules including a first rule for matching a non-measured identifier stored in a first field from across a plurality of raw sensor data points captured during a period of time identified by the aggregation granularity, and a second rule for aggregating a measured numerical value stored in a second field from across the plurality of raw sensor data points which are matched by the first rule to create a total measured numerical value for the non-measured identifier during the period of time;
processing, via the processor, the data rollup engine on the raw sensor data based on the different rolling-up rules identified from the instruction set to generate rolled-up sensor data comprising the total measured value for the non-measured identifier during the period of time; and
outputting, via the processor, information identifying a value of each of the fields of the rolled-up sensor data to a user interface displayed on a display device.

18. The method of claim 17, wherein the data rollup engine comprises a software library embedded within a software application.

19. The method of claim 17, wherein the identifying further comprises identifying an identification of a field of data included in the raw sensor data, the rolling-up rules for aggregating data included in the field, and a data structure format for outputting the aggregated data of the field, from the instruction set.

20. The method of claim 19, wherein the instruction set further comprises a filter that removes non-rollable data from the raw sensor data before the sensor data is rolled-up.

21. The method of claim 1, wherein a rolling-up rule for a first field of the raw sensor data comprises a summing of all data values of the raw sensor data together resulting in an aggregate value, and a rolling-up rule for a second field of the raw sensor data comprises merging all unique data values of the raw sensor data together resulting in one single data value for each unique data value.

* * * * *